(12) United States Patent
Dalibey et al.

(10) Patent No.: US 8,235,066 B2
(45) Date of Patent: Aug. 7, 2012

(54) AUTOMATICALLY TRIPPED COMPACT SAFETY DEVICE FOR CONTROLLING THE FLOW OF A FLUID

(75) Inventors: Amine Dalibey, Villejuif (FR); Didier Mangon, Amiens (FR)

(73) Assignee: GDZ Suez, Paris (FR)

( * ) Notice: Subject to any disclaimer, the term of this patent is extended or adjusted under 35 U.S.C. 154(b) by 368 days.

(21) Appl. No.: 12/601,700

(22) PCT Filed: May 19, 2008

(86) PCT No.: PCT/FR2008/050864
§ 371 (c)(1),
(2), (4) Date: Mar. 1, 2010

(87) PCT Pub. No.: WO2008/145939
PCT Pub. Date: Dec. 4, 2008

(65) Prior Publication Data
US 2010/0200086 A1 Aug. 12, 2010

(30) Foreign Application Priority Data
May 25, 2007 (FR) .................... 07 03767

(51) Int. Cl.
*G05D 7/01* (2006.01)
*F16K 51/00* (2006.01)
(52) U.S. Cl. ................... 137/498; 137/315.33; 137/507; 137/517

(58) Field of Classification Search ............. 137/315.01, 137/315.33, 497, 498, 507, 517; 251/143
See application file for complete search history.

(56) References Cited

U.S. PATENT DOCUMENTS

| 4,856,552 A * | 8/1989 | Hiemstra ...................... 137/497 |
|---|---|---|
| 4,958,657 A | 9/1990 | Hagan et al. |
| 6,328,072 B1 | 12/2001 | Mahe et al. |
| 6,962,165 B2 | 11/2005 | Delprat et al. |
| 7,527,240 B2 | 5/2009 | Mesnier et al. |
| 2004/0103943 A1 | 6/2004 | Delprat et al. |
| 2009/0256548 A1 | 10/2009 | Haudeville et al. |
| 2010/0000313 A1 * | 1/2010 | Leme et al. ................. 73/272 R |

FOREIGN PATENT DOCUMENTS
EP   1 059 481   12/2000
* cited by examiner

*Primary Examiner* — John Rivell
(74) *Attorney, Agent, or Firm* — Harness, Dickey & Pierce, P.L.C.

(57) ABSTRACT

The disclosure relates to a safety device to be inserted in a pipe through which a fluid flows from an upstream side to a downstream side, this device comprising a tube offering the fluid a central flow path controlled by a central valve which closes in the event of excessive flow of this fluid, an elastically deformable annular shutter mounted on the external periphery of the tube, and retention clamps. According to the disclosure, each of the clamps has a tied end fastened to the periphery of the tube upstream of the annular shutter and can adopt, under the effect of a radial compression, a folded configuration in which its free end is turned towards this annular shutter.

10 Claims, 3 Drawing Sheets

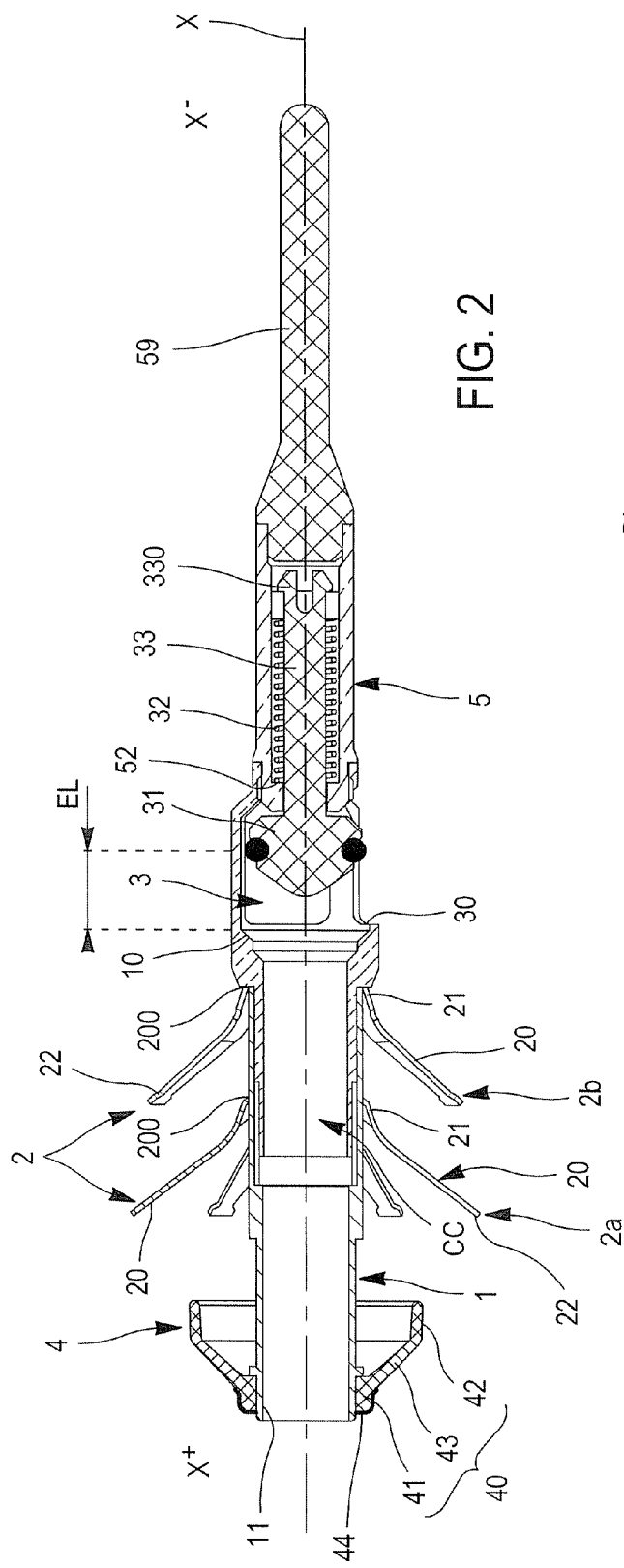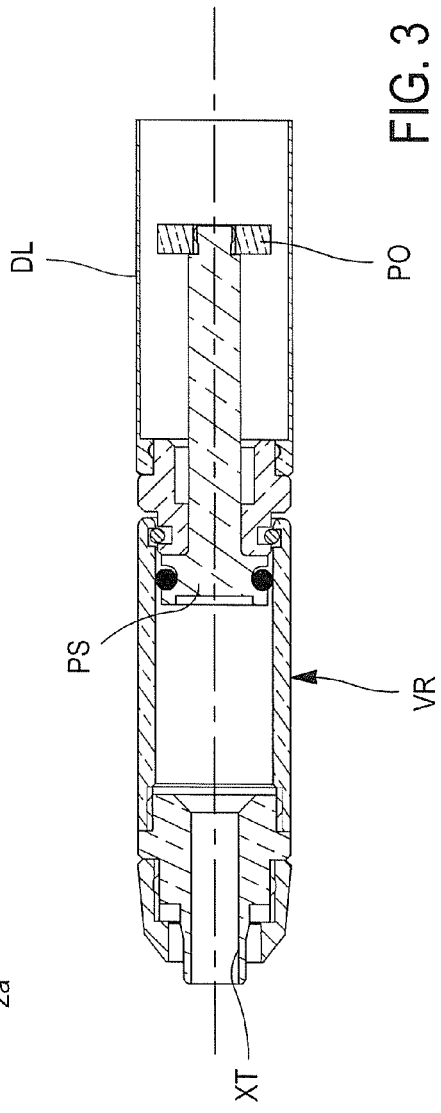

AUTOMATICALLY TRIPPED COMPACT SAFETY DEVICE FOR CONTROLLING THE FLOW OF A FLUID

CROSS-REFERENCE TO RELATED APPLICATIONS

This application is a National Phase Entry of International Application No. PCT/FR2008/050864, filed on May 19, 2008, which claims priority to French Application No. 0703767, filed on May 25, 2007, both of which are incorporated by reference herein.

BACKGROUND AND SUMMARY

The present invention generally relates to the devices of the type represented by automatically tripped safety valves used in gas distribution systems. More particularly, the invention relates to a safety device inserted in a fluid pipe of minimum cross-sectional area determined in order to protect it from an excess flow of the fluid flowing therein from upstream to downstream, this device comprising:

a tube exhibiting open upstream and downstream ends offering the fluid a central flow path, retention means for holding this device in place within the pipe, control means for controlling the fluid circulation, including a central valve and an elastically deformable annular shutter and fastened to the outer periphery of the tube, and a hollow body fastened to the tube in the extension and upstream from this tube, The retention means including a first set of clamps, each one of which exhibits a free end biased by an elastic force towards a radial unfolding configuration equivalent to that of the spokes of an open umbrella, and this device moves between a resting configuration, which it adopts in the event of normal fluid flow and wherein the central valve frees the central flow path, and a safety configuration, which it adopts in the event of an excessive fluid flow and wherein the central valve shuts-off the central flow path.

A device fitting this generic definition is particularly known to those skilled in the art from U.S. Pat. No. 6,962,165. Some fluid distribution systems require special safety measures, imposed by the nature of the transported fluid and by any possible risk of damage occurring to the ducts which constitute these systems. For example, the gas distribution systems in urban areas usually lie under roads and pavements, that is, under public land structures, likely to undergo various works, notably earthworks. However, if a gas duct is accidentally pulled up or severed during such works, the immediately resulting gas leak creates a high risk of fire or explosion.

In this context, safety valves have been developed to shut-off the gas ducts as soon as an abnormally high flow of gas is detected therein. However, to date, the safety valves can only be easily mounted onto new systems in the process of being laid, or possibly onto existent systems, but only during their renovation. In fact, as the ducts of the existing systems may have been constructed at different periods and according to different standards, meaning that they do not necessarily have very precisely defined diameters and exhibit, obstacles, flashes, buckles, restrictions, and/or varied bend radiuses along their run, the implementation of a safety valve in an existent system remains a tricky job. Thus, although the valve described in the aforementioned U.S. Pat. No. 6,962,165 has been designed to make such operation possible, its specific design limits its application to systems exhibiting relatively high bend radiuses.

Designed in this context, the object of the invention is hence to propose a safety device liable to be set up without excavation, in most known systems including in systems exhibiting low bend radiuses, for example of about ten times the diameter of the pipe wherein this device is introduced. To this end, the device of the invention, which still further conforms to the generic definition given in the preamble above, is substantially characterized in that each one of the clamps exhibits a tied end fastened to the periphery of the tube upstream from the annular shutter, and in that these clamps selectively exhibit, under the application of a radial compression, a folded configuration wherein their respective free ends are turned towards this annular shutter. Preferably, the annular shutter comprises a seal made in an elastomeric material whereof a downstream end is fastened to the tube, this seal exhibiting a rotational symmetry, an at least partially conical axial cross-section, and a concavity turned upstream. Furthermore, it is judicious that the seal of the annular shutter be provided such that it selectively exhibits, under the application of a radial compression, a total diameter less than that of the determined minimal cross-sectional area of the pipe, and the absence of stress, a total diameter higher than that of the determined minimal cross-sectional area of the pipe.

In order to optimize the tightness of the device, the seal of the annular shutter may be advantageously edged with a substantially cylindrical lip coaxial to the tube. Furthermore, in order to prevent the reversal of the seal, the annular shutter may comprise a retention ring reinforcing the downstream end of the seal and holding it on the tube. In an effective embodiment of the invention, the retention means comprise a ring tightly encircling the tube and linking together the respective tied ends of the clamps of the first set of clamps.

Furthermore, each of the clamps may exhibit, from its tied end towards its free end, a width that first decreases over the seven eighths at least of its length until it reaches a minimal value, then an increasing width starting from this minimal value. Each of these clamps may further exhibit, in the unfolding configuration, a curvature that moves it away from the tube at an increasing distance from its tied end. In addition to the first set of clamps, the retention means may include a second set of clamps of the same constitution as the first set and shifted axially along the tube with respect to this first set, the clamps of the first and second sets being arranged in staggered rows. An optimal holding of the device in the pipe may be obtained by making the retention means from steel.

BRIEF DESCRIPTION OF DRAWINGS

Other features and advantages of the invention will become more apparent from the following description thereof, given only by way of a non limitative example, with reference to the accompanying drawings, wherein;

FIG. 2 is a longitudinal cross sectional view of the device shown in FIG. 1, the scale of which has been slightly reduced;

FIG. 3 is a longitudinal cross sectional view of a tool for setting a device in accordance with the invention in a pipe.

DETAILED DESCRIPTION

Figure 1:
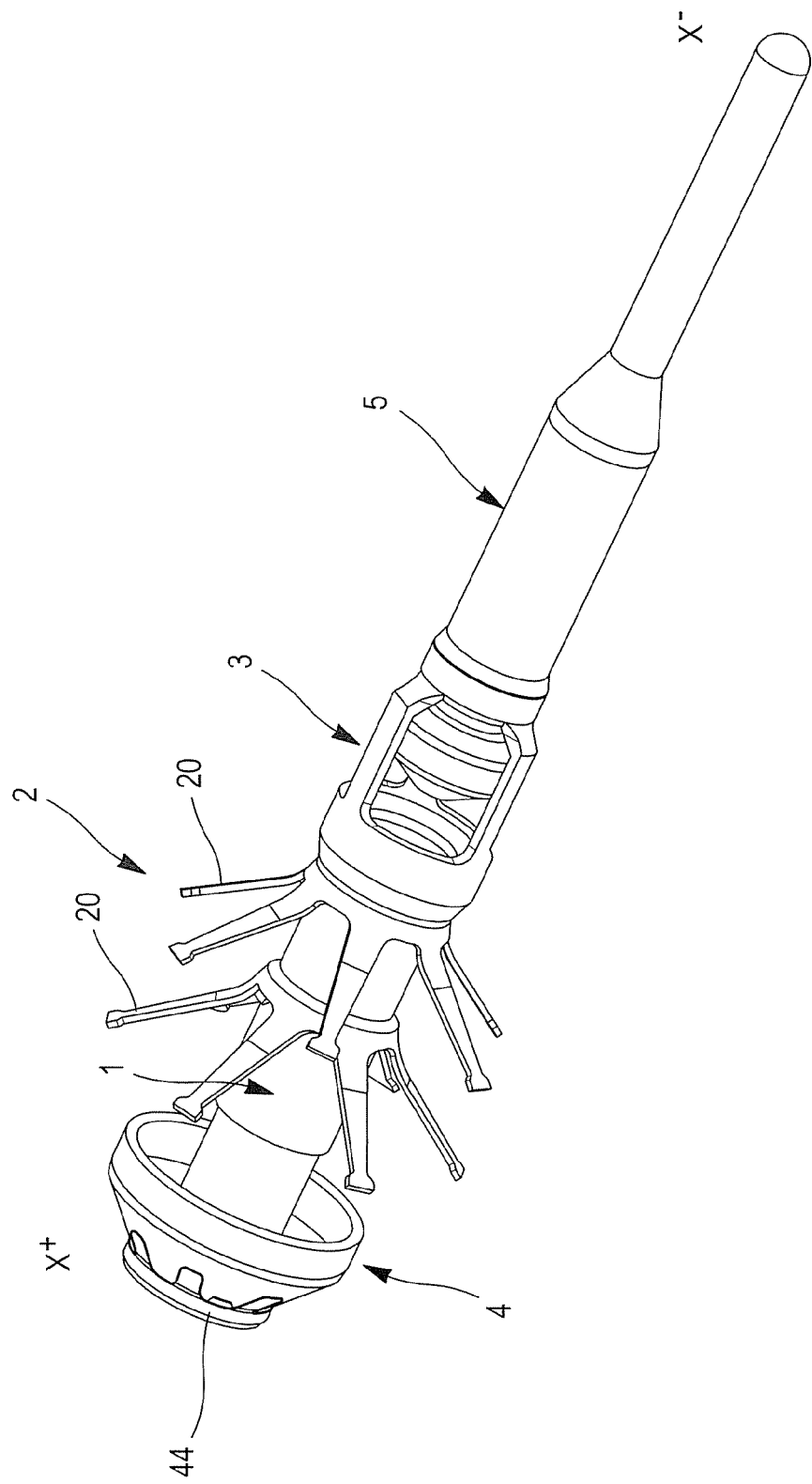
FIG. 1 is an enlarged perspective view of a device in accordance with the invention, shown in the configuration that it adopts in the absence of stress.

As previously stated, the invention relates to a safety device designed to be inserted into a pipe K of fluid of a determined minimal cross-sectional area S, and more specifically into a gas pipe in the preferred application of the invention, so as to protect this pipe against an excessive fluid flow, and more specifically of the gas, which circulates therein from an upstream side (X−) to a downstream side (X+). In a manner known per se, this device substantially comprises a tube 1, retention means 2 for holding the tube 1 in place in the pipe K, control means for controlling the fluid circulation including a central valve 3 and an annular shutter 4, and a hollow body 5 fastened to the tube 1 in the extension of and upstream from this tube. Tube 1 that may be composed of several parts, is open at its upstream 10 and downstream 11 ends, and thus, spontaneously provides the fluid with a central flow path CC (FIG. 2), controlled by the central valve 3.

As is once again shown in this Figure, hollow body 5 and tube 1 are longitudinally spaced apart from each other by an open longitudinal space EL offering the fluid flowing in the pipe K a passage controlled by the central valve 3 and which links the external part of the hollow body 5 to the internal part of the tube 1. In these conditions, the device of the invention may change between a resting configuration, which it adopts in the event of a normal flow of fluid and wherein the central valve 3 frees the central flow path CC, and a safety configuration, which it adopts in the event of an excessive flow of fluid and wherein the central valve 3 shuts-off the central flow path CC. The central valve 3 is substantially composed of a valve seat 30 formed on tube 1, a central shutter 31 that rests on the valve seat 30 in the safety configuration, and a spring 32.

Spring 32 exerts on the central shutter 31 an opening elastic force that biases this shutter 31 at a distance from the valve seat 30, against a closing force exerted on this central shutter 31 by an experienced head loss, between the regions directly upstream and downstream of the central shutter, by the fluid circulating in pipe K. As long as the flow of fluid in this pipe is normal, the closing force is overcome by the force exerted by spring 32, such that the central shutter 31 is held at a distance from the valve seat 30. On the other hand, as soon as the flow of fluid in the pipe K becomes excessive, the force exerted by spring 32 is overcome by the closing force exerted by the head loss, that increases with the flow, such that the spring 32 is compressed and the central shutter 31 is pressed on the valve seat 30.

As the skilled person will easily understand at least upon reading the above, the limit value of the flow beyond which this flow is considered as excessive may be adjusted by regulating the calibrating force of spring 32. The central shutter 31 is for example fastened to the downstream end of a rod 33 whereon acts the spring 32, this rod 33 and the spring 32 being housed and guided in the hollow body 5 and hence, arranged upstream of tube 1. For example, spring 32 is interposed between an inner thrust bearing 52 of hollow body 5 and a thrust bearing 330 formed on rod 33.

As shown, the upstream profile of the device or of the hollow body 5 may be optimized aerodynamically by adding a flexible part 59 in the shape of an airplane nose, fastened to the hollow body 5 upstream and in the extension thereof, this part 59 making it possible to reduce the head losses of the device by minimizing the disruptions of the fluid flux, to guide the device in the elbows of pipe K, and to serve as an upstream thrust bearing to the device when it is set-up in a connection plug. The retention means 2 comprise one or several crowns, such as 2a and 2b, of retention clamps 20. Each of these clamps 20 exhibits a free end 22 biased by an elastic force towards a radial unfolding configuration, shown on FIGS. 1 and 2, and equivalent to that of the spokes of an open umbrella.

According to an aspect of the invention, each of these clamps 20 exhibits a tied end 21 which is fastened to the periphery of tube 1, upstream from the annular shutter 4 and downstream from the central valve 3. For the setting up of the device in pipe K, the clamps 20 should be folded back radially towards the tube 1 to make it possible for this device to progress in this pipe despite the existence of possible diameter restrictions in this pipe, after which the clamps 20 are allowed to spontaneously recover their unfolded configuration to ensure the anchoring of this device inside the pipe. This setting up may be achieved through the use of a tool such as shown in FIG. 3, known per se from patent EP 1 059 481, and serving as a vector to the device of the invention.

For example, such a tool comprises a socket DL associated to a hydraulic jack VR, in this case, a hydraulic jack, the piston PS of which is extended by a push-type member PO designed to controllably move within socket DL. This tool is carried by an end of a flexible bead (not shown) that can be introduced in the pipe K to the selected point for the setting of the device of the invention. To introduce the device of the invention in a pipe, this device is first placed, in a folded configuration and radially compressed in socket DL of this tool. The tool is pushed into the pipe by means of the flexible bead, until the socket DL reaches the selected location for setting the device.

An hydraulic fluid is then injected, through the bead into an end XT of the jack VR, and the push-type member PO, driven by the piston PS, expels the device from the socket DL. This process is made possible by the fact that the device of the invention may be compressed in the socket DL until it reaches a highly reduced diameter that facilitates the crossing of narrow passages of pipe K. Furthermore, the radial elastic force developed by the clamps 20 in a constricted state in the socket DL are sufficient to ensure the mechanical cohesion of the assembly formed by the socket DL and the device of the invention for its introduction into the pipe.

According to another aspect of the invention, the clamps 20 exhibit, under the application of a radial compression and particularly in their constricted state inside the socket DL, a folded configuration in which their respective free ends 22 are turned towards the annular shutter 4 and, for some clamps at least, immediately adjacent to this shutter. This arrangement has the effect of minimizing the length of the socket DL, hence of the inserting tool shown in FIG. 1 and more generally of the assembly of the inserting tool and of the safety device, making it possible for this assembly to pass through the elbows of the pipe K exhibiting relatively low bend radiuses. As shown in FIGS. 1 and 2, the annular shutter 4 comprises a seal 40 made from an elastomeric material a downstream end 41 of which is fastened to tube 1.

This seal is edged on its upstream end by a substantially cylindrical lip 42 coaxial to tube 1, and exhibits an at least partially conical-shaped intermediary axial cross-section 43. This seal 4 assembly further exhibits a rotational symmetry around the longitudinal axis X of the device, and a concavity turned towards the upstream side X−. Under the effect of a radial compression, and particularly when it is compressed in the socket DL, the seal 40 exhibits, by construction, a total diameter less than that of the minimal cross-section of the pipe, whereas this seal, when freed from any stress, exhibits a total diameter not only larger than that of the minimal cross-section of the pipe, but preferably even a total diameter at least close to the maximal cross-section of this pipe. In other words, seal 40 exhibits dimensions that make it possible for the lip 42 to spontaneously press against the inner wall of the pipe K as soon as the safety device is set up.

Furthermore, when the pipe K experiences a flow of fluid, lip 42 of seal 40 is subject to, at least after the closing of the central valve 3, a forced radial expansion that presses it even more against the inner wall of pipe K and which leads to an optimal obstruction of the area comprised between the periphery of the tube 1 and the inner wall of the pipe. In order to prevent the reversal of seal 40, at that time subjected to considerable stress, by modifying the direction of its concavity, the downstream end 41 of seal 40 may be reinforced by a corolla-shaped retention ring 44, of same taper as that of seal 40, and which holds its downstream end 41 on tube 1.

Figure 4:
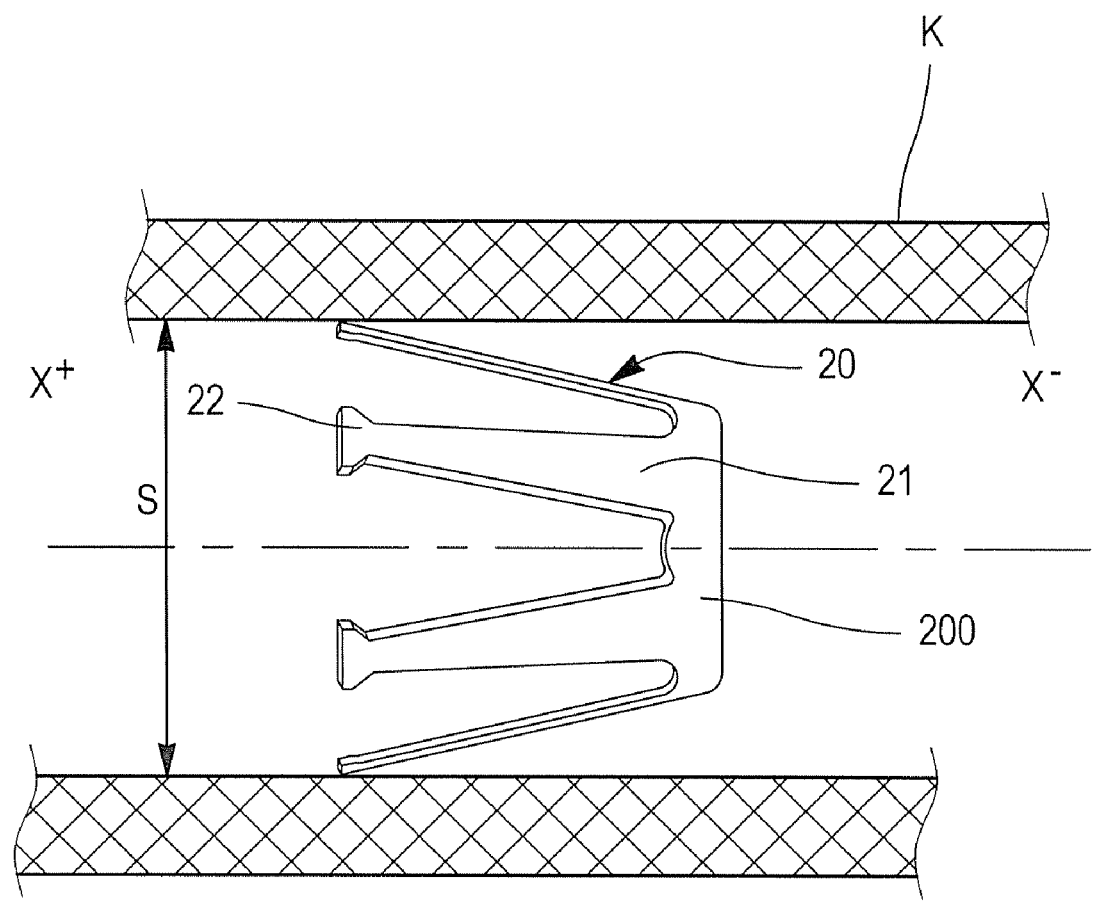
FIG. 4 is an enlarged longitudinal cross sectional view of a component of a device according to the invention, shown after its insertion in a pipe.

As particularly shown by FIGS. 1 and 4, the retention means 2 preferably comprise a ring 200 that tightly encircles the tube 1 and that links the respective tied ends 21 of the clamps 20 of each crown or set of clamps, 2a and 2b, to each other. In the event where the device of the invention comprises, apart from a crown 2a of clamps arranged at the immediate vicinity of the seal 40, a second crown 2b of clamps, this second crown advantageously exhibits the same constitution as that of the first crown 2a and is shifted axially along the tube 1 with respect to the first crown, the clamps 20 of the neighboring crowns 2a and 2b being arranged in staggered rows. In order to optimize the holding of the device in the pipe K, each crown 2a and 2b is for example made of steel.

Furthermore, it is judicious to provide each one of the clamps 20 such that it exhibits, from its tied end 21 towards its free end 22, a width first decreasing over the seven eighths at least of its length until it reaches a minimal value, then an increasing width from this minimal value. The elastic return force of the clamps 20 may then be optimized by providing each one of the clamps 20, in the unfolding configuration, a curvature that moves it away from the tube 1 at an increasing distance from its tied end 21.

The invention claimed is:

1. A safety device inserted in a pipe of fluid of determined minimal cross-sectional area to protect it from an excessive flow of fluid flowing therein from an upstream side to a downstream side, this device comprising:
    a tube exhibiting open upstream and downstream ends and providing the fluid with a central flow path;
    a retainer holding this device in place in the pipe;
    a controller controlling the fluid circulation, including a central valve and an elastically deformable annular shutter fastened to the outer periphery of the tube; and
    a hollow body fastened to the tube in the extension of and upstream from this tube;
    the retainer including a first set of clamps each one of which exhibits a free end biased by an elastic force towards a radial unfolding configuration equivalent to that of the spokes of an open umbrella, and this device moving between a resting configuration which it adopts in the event of a normal flow of the fluid and in which the central valve frees the central flow path, and a safety configuration, which it adopts in the event of an excessive flow of fluid and in which the central valve shuts-off the central flow path; and
    each one of the clamps exhibiting a tied end fastened to the periphery of the tube upstream from the annular shutter, and in that these clamps selectively exhibit, under the application of a radial compression, a folded configuration in which their respective free ends are turned towards this annular shutter.

2. The safety device according to claim 1, wherein the annular shutter comprises a seal made of an elastomeric material a downstream end of which is fastened to the tube, this seal exhibiting a rotational symmetry, at least a partially conical axial cross-section, and a concavity turned upstream.

3. The safety device according to claim 2, wherein the seal selectively exhibits, under the application of a radial compression, a total diameter less than that of the determined minimal cross-sectional area of the pipe, and in the absence of stress, a total diameter larger than that of the determined minimal cross-sectional area of the pipe.

4. The safety device according to claim 2, wherein the seal is edged by a substantially cylindrical lip coaxial to the tube.

5. The safety device according to claim 2, wherein the annular shutter further comprises a retention ring reinforcing the downstream end of the seal and holding it on tube.

6. The safety device according to claim 1, wherein the retainer comprises a ring encircling the tube and linking the respective tied ends of the clamps of the first set of clamps.

7. The safety device according to claim 1, wherein each one of the clamps exhibits, from its tied end towards its free end, a width that first decreases at least over the seven eighths of its length until it reaches a minimal value, then an increasing width starting from this minimal value.

8. The safety device according to claim 1, wherein each one of the clamps exhibits, in the unfolding configuration, a curvature that moves it away from the tube at an increasing distance from its tied end.

9. The safety device according to claim 6, wherein the retainer includes a second set of clamps of the same constitution as the first set and shifted axially along the tube with respect to this first set, the clamps of the first and second sets being arranged in staggered rows.

10. The safety device according to claim 1, wherein the retainer is made from steel.

* * * * *